Dec. 26, 1933.  P. L. BELLASCHI  1,940,840
ELECTRICAL APPARATUS
Filed Sept. 30, 1932  4 Sheets-Sheet 1

WITNESS
Fred C. Williams

INVENTOR
Peter L. Bellaschi
BY
Franklin E. Hardy
ATTORNEY

Dec. 26, 1933.  P. L. BELLASCHI  1,940,840
ELECTRICAL APPARATUS
Filed Sept. 30, 1932  4 Sheets-Sheet 2
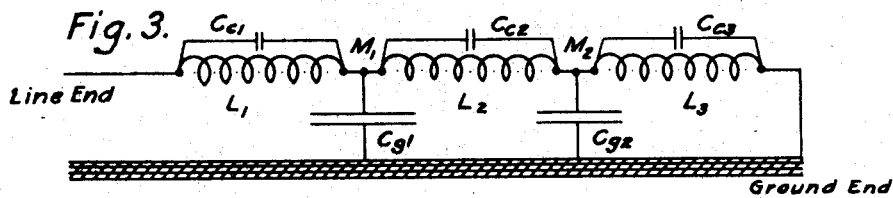
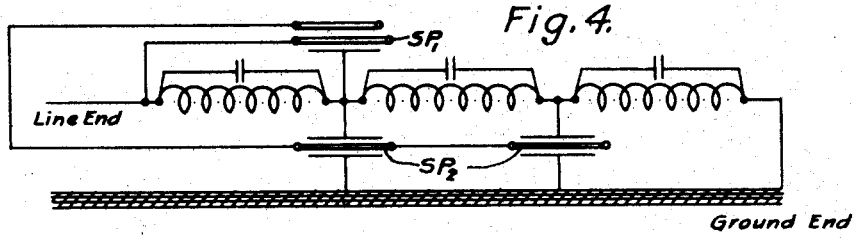
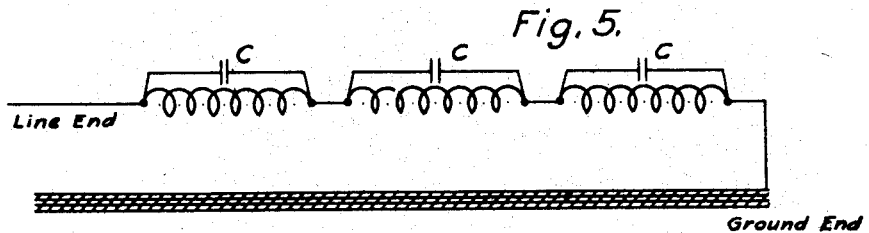
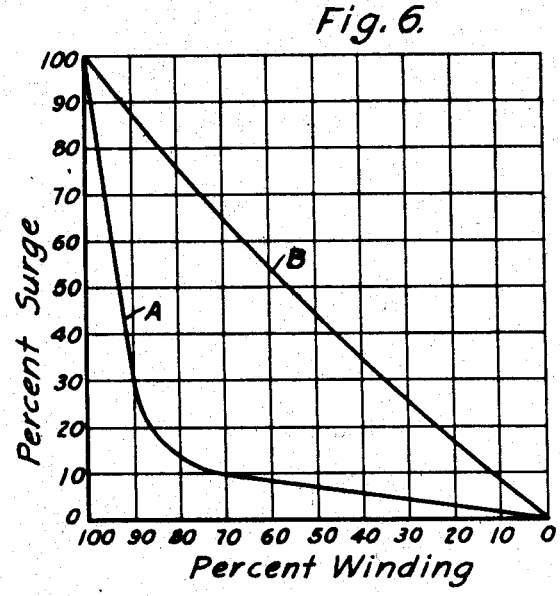
INVENTOR
Peter L. Bellaschi
BY
Franklin E. Hardy
ATTORNEY Dec. 26, 1933.   P. L. BELLASCHI   1,940,840
ELECTRICAL APPARATUS
Filed Sept. 30, 1932   4 Sheets-Sheet 3

INVENTOR
Peter L. Bellaschi
BY
Franklin E. Hardy
ATTORNEY

Dec. 26, 1933.  P. L. BELLASCHI  1,940,840
ELECTRICAL APPARATUS
Filed Sept. 30, 1932   4 Sheets-Sheet 4

WITNESS
Fred. C. Williams

INVENTOR
Peter L. Beilaschi
BY
Franklin E. Hardy
ATTORNEY

Patented Dec. 26, 1933

1,940,840

UNITED STATES PATENT OFFICE 1,940,840

ELECTRICAL APPARATUS

Peter L. Bellaschi, Sharon, Pa., assignor to Westinghouse Electric & Manufacturing Company, East Pittsburgh, Pa., a corporation of Pennsylvania Application September 30, 1932
Serial No. 635,545

8 Claims. (Cl. 175—356)

My invention relates to methods of and means for improving the electrostatic distribution of surge voltages in the windings of electrical apparatus.

In the windings of electrical apparatus, such as transformers, that are connected to a transmission line, the voltage between the terminals of a winding varies uniformly from one end of the winding to the other, under normal frequency and voltage conditions of the system. However, during certain conditions of the system, such as may be caused by lightning or by switching operations on the transmission line, a high voltage surge may occur on the transmission line and enter the winding of the transformer.

In windings of the usual construction, a voltage surge will not immediately distribute itself along the winding in a manner to establish a uniform voltage gradient, but its initial distribution produces a high concentration of voltage stress on parts of the winding connected near to the line terminal. This initial voltage gradient results from the values of the electrostatic conditions existing between the winding and ground and between adjacent portions of the winding, such as between different winding turns or groups of turns.

Because of the inductance of the winding, a redistribution of energy from the electrostatic state takes place in the winding causing oscillations of the voltage values therein about its final or uniform distributed value that are caused by the inductance and capacity of the winding. The amplitude of the oscillations will initially correspond to the difference between the initial voltage and the final voltage distribution along the winding. These oscillations create successive voltage stresses between adjacent parts of the winding and between the winding and ground.

The problem of insulating the conductors and coils of a transformer winding to withstand the surge voltages impressed upon them, is a difficult one, because in the usual construction of these parts the conductors are so small that satisfactory means of applying sufficient insulation to withstand the voltage stresses are not readily available. If sufficient insulating material is applied about the conductors, the space factor between the conductors would become so large as to affect the efficiency of the design. It is, therefore, desirable to provide means for lessening the voltage stresses between the several parts of the winding that are caused by the concentration of surge voltages in order to produce satisfactory operation of the apparatus.

It is an object of my invention to provide electrostatic plates in an electrical apparatus so positioned and dimensioned as to substantially neutralize the capacitance current of the winding to ground upon the occurrence of a rapid change in voltage across the winding of the electrical apparatus.

Another object of my invention is to provide means for protecting the winding of an electrical apparatus from the transient voltage distribution effect of a surge entering the winding.

Another object of my invention is to provide a capacity network for electrical windings comprising a plurality of static plates that is balanced electrostatically to correspond in its voltage distribution to a uniform voltage distribution or to the voltage distribution of the inductance network of the winding.

A further object of my invention is to provide a plurality of electrostatic plates in the space between a winding and ground so dimensioned and spaced as to provide a uniform voltage distribution in the space between the winding and ground.

In the drawings:

Fig. 3 is a diagram illustrating an equivalent network circuit of the usual core type winding.

Figs. 4 and 5 are diagrams illustrating equivalent network circuits of a winding employing the electrostatic plates of the winding of Fig. 1.

Fig. 6 is a diagram illustrating curves showing the initial surge voltage distribution in the transformer winding.

Figure 1:
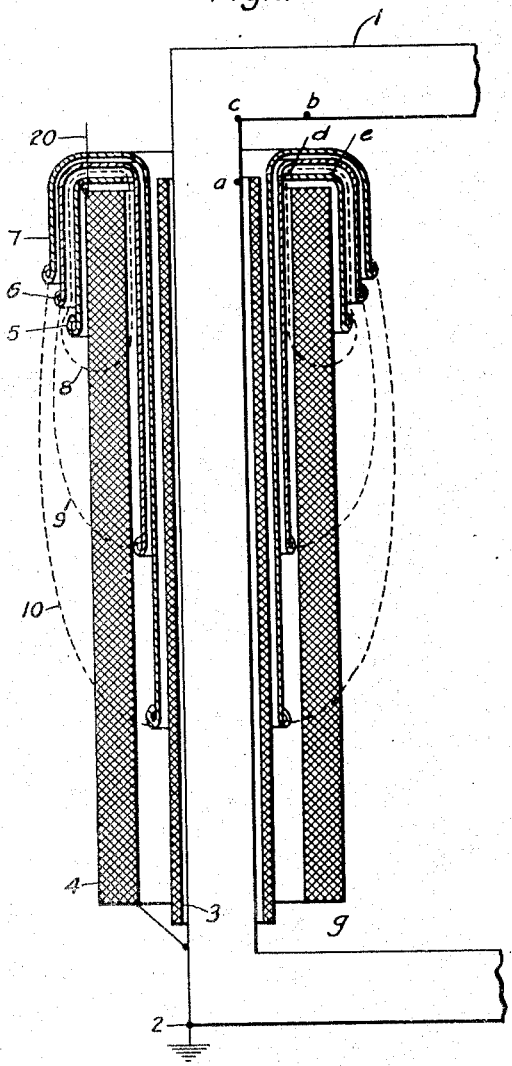
Figure 1 is a vertical sectional view of the windings of a core type transformer showing electrostatic plates arranged in acordance with one embodiment of my invention.

Referring to the drawings and more particularly to Fig. 1 thereof, a core structure 1 is illustrated having a winding leg about which is positioned a low-tension winding 3 and a high-tension winding 4, one end of the high-tension winding 4 being grounded through the core 1 and the ground connection 2. The opposite end of the winding 4 is connected to the high-tension terminal conductor 20 of a transmission line and is provided with a line static plate 5 that extends across the end of the winding and downwardly about the upper end thereof.

A second electrostatic plate 6, that is capacitively coupled to the line static plate 5, is positioned about the line static plate and extends into the high-to-low space between the windings 3 and 4. The plate 6 extends downwardly opposite a point in the high voltage winding which for the condition of uniform voltage distribution corresponds in potential to the potential of the plate, thus causing the equi-potential surface of the plate to cut the winding in such location as to effect an even distribution of voltage along the winding.

Other electrostatic plates, similarly coupled to the adjacent plates in series between the high-voltage and the low-voltage windings, may be employed; one of which is shown, namely, the electrostatic plate 7. The plate 7 is electrostatically coupled to the plate 6 and is spaced therefrom and extends downwardly in the high-to-low space between the windings 4 and 3 to a point adjacent the high voltage winding 4 corresponding to the voltage of the electrostatic plate 7.

The area, position, and extension of the electrostatic plates is so designed in relation to the winding 4, that the capacity network of the winding resulting from the combined effect of the series of plates is balanced electrostatically to correspond in voltage distribution to the voltage distribution of the equivalent inductance network of the winding 4. It will be noted that the equi-potential surfaces of the electrostatic plates shown in dotted lines in Fig. 1, are carried well down the winding stack, thus effecting a much more evenly distributed voltage along the stack than would exist if the voltage stress were concentrated, as is normally the case in the usual type of winding, about the high-voltage end of the winding.

The dotted lines 8, 9 and 10 in Fig. 1 represent equipotential surfaces, the surface 8 extending between the line static plate 5 and the first floating electrostatic plate 6. The surfaces 9 and 10 correspond respectively to the electrostatic surfaces of the plates 6 and 7.

The diagram in Fig. 3 of the drawing represents the simplified equivalent circuit of a conventional core type winding. The capacity to ground of the winding is represented by the capacities $C_{g1}$ and $C_{g2}$. The capacities $C_{c1}$, $C_{c2}$ and $C_{c3}$ represent the capacities between groups of turns or across segments of the winding, and the inductances $L_1$, $L_2$ and $L_3$ represent the inductance of these winding segments. $M_1$ and $M_2$ represent the mutual inductance between segments of the winding.

The initial or electrostatic voltage distribution of a steep front surge in a conventional core type winding is determined by the electrostatic or capacity network of the winding and is represented by the curve A of Fig. 6. The final distribution of voltage is determined by the inductance network of the winding and is practically uniform, as shown by the curve B in Fig. 6.

The diagram of Fig. 4 is a modification of the equivalent circuit of the winding of the diagram in Fig. 3 caused by placing electrostatic plates to balance the capacity network of the winding, such as are provided in Fig. 1 of the drawings. For the sake of simplicity, only two electrostatic plates are shown in the diagram. Any number of plates may be used, the design of the plates being such that the result of the several capacities between the winding and ground is to balance the capacity network of the winding.

In the diagram of Fig. 4, $SP_1$ represents the line static plate connected to the high-voltage terminal of the winding, and $SP_2$ represents a floating static plate coupled to the line static plate and extending between the winding and ground. The capacity elements and the coupling between the static plates, winding and ground, are shown in the diagram. The electrostatic network is balanced to give a uniform initial voltage distribution corresponding to the final distribution represented by the curve B in Fig. 6.

Since the effect of the electrostatic plates shown in the equivalent circuit of Fig. 4 is to balance the electrostatic network, to give uniform initial voltage distribution corresponding to the final distribution of the winding, the equivalent circuit of the winding may be represented by the circuit of Fig. 5 in which the capacities C, C, C are of such value as to produce an initial uniform voltage distribution.

Referring to Fig. 6, the curve A represents the initial distribution of voltage along a winding stack of the usual type in which the capacity network is unbalanced and does not correspond to the final uniform voltage distribution or the distribution due to the inductance network, and the curve B illustrates the initial distribution of surge voltage along the winding stack 4 when the capacity network is balanced electrostatically to correspond in its voltage distribution to the voltage distribution of the inductance network, by means of the electrostatic plates 5, 6, 7, etc., of Fig. 1. These plates extend substantially about the axis of the winding leg of the transformer core except for a gap therein to prevent them from acting as short-circuited transformer winding turns.

The function of these electrostatic plates, as may be seen in the circuit diagrams in Figs. 3, 4 and 5, is, first, to neutralize the capacities between the coils and ground and, second, to provide a more uniform dielectric field throughout the length of the winding and the entire insulation structure.

The value of the capacities established by these electrostatic plates should be such that the electrostatic field established by these capacities is effective to produce substantially a straight line gradient between the terminals of the winding at the instant of impact of a high voltage surge upon the winding.

By employing the multiple arrangement of the electrostatic plates illustrated and described herewith, each plate, beginning with the line static plate 5, is capacitatively coupled to the next adjacent plate of the series, and the combined arrangement of the metallic plates 5, 6, 7 and ground may be so designed that uniform initial voltage distribution is secured, both along the winding 4 and in the major insulation between the high voltage winding 4 and the low voltage winding 3 or ground. The arrangement of the plates operates in principle similar to a number of condensers connected in series. The metallic plates 5, 6, 7 and ground are designed and so disposed that the electrostatic voltage distribution between points $d$ or $e$ on the line static plate 5 to the points $a$, $b$, or $c$ on the core, the point $g$ at the lower end of the winding, or the tank wall is substantially uniform. Since the electrostatic voltage distribution is uniform and corresponds to the magnetic voltage distribution of the winding, the voltage throughout the winding and the insulation remains substantially uniform for surges of any wave shape applied to the winding.

In the embodiment of the invention illustrated in Fig. 1, the line static plate 5 extends downwardly along thhe winding 4 for the sole purpose of securing the correct surface area for capacitively coupling to the adjacent metallic plate surfaces. The plate 5 is connected to the high tension terminal 20 of the winding 4 and all other plates of the series are floating.

Figure 2:
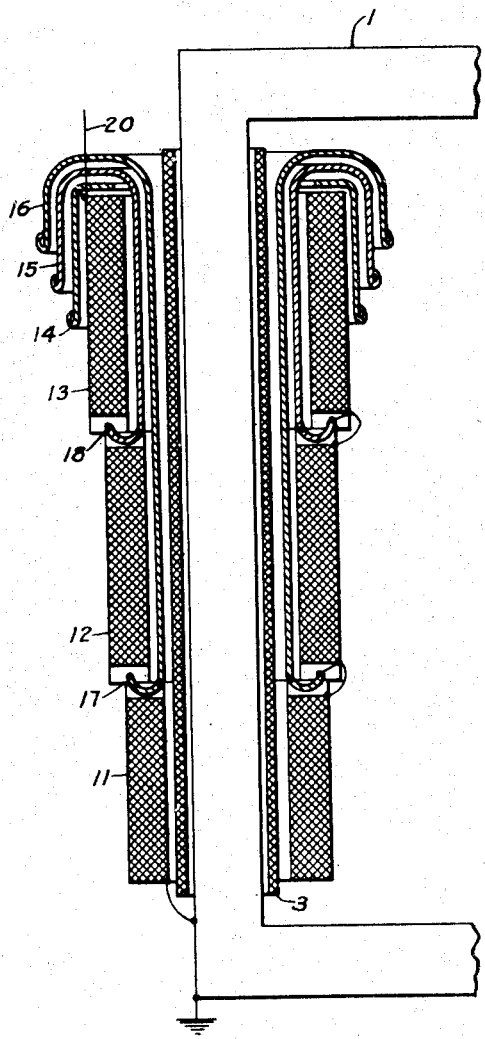
Fig. 2 is a sectional view of the windings of a core type transformer in which the several coils of the high tension winding are arranged to provide for graded insulation.

In the embodiment of the invention illustrated in Fig. 2, the winding 4 is divided into three sections or coils 11, 12 and 13 that are progressively of larger diameter as we approach the top or high-voltage end of the winding. The increasing diameter of the winding stack adjacent the high-voltage end thereof, permits the insulating material between the high-voltage winding and the low-voltage winding to be graded in proportion to the voltage stress between the high and low voltage winding and ground. In this embodiment of the invention, a line static plate 14, similar to the line static plate 5 of Fig. 1, is connected to the high-tension terminal of the winding and electrostatic plates 15 and 16 are provided that are capacitively coupled and extend downwardly in the high-to-low space between the high and low voltage windings, as in the embodiment illustrated in Fig. 1. The plate 15 is, however, shown as curved outwardly from the core and connected to the winding at 18, between the coils 12 and 13, and the plate 16 is similarly curved outwardly from the core and connected to the winding at 17, between the coils 11 and 12, thus, definitely establishing the voltages of the winding at these points upon the occurrence of a voltage surge.

The series arrangement of the electrostatic plates illustrated in Fig. 1, may be modified in detail in a number of ways. For example, as in Figs. 7 and 8, an arrangement of the plates is shown in which the floating electrostatic plates 23 and 25 are inserted in the high-to-low space on opposite sides of the electrostatic plate 24, the plate 23 being nearer to the high voltage coil 4 and the plate 25 being nearer to the low voltage coil 3. The plates 23 and 25 do not extend across the upper end of the winding 4 and downwardly on the outside thereof as in the construction illustrated in Fig. 1.

Figure 7:
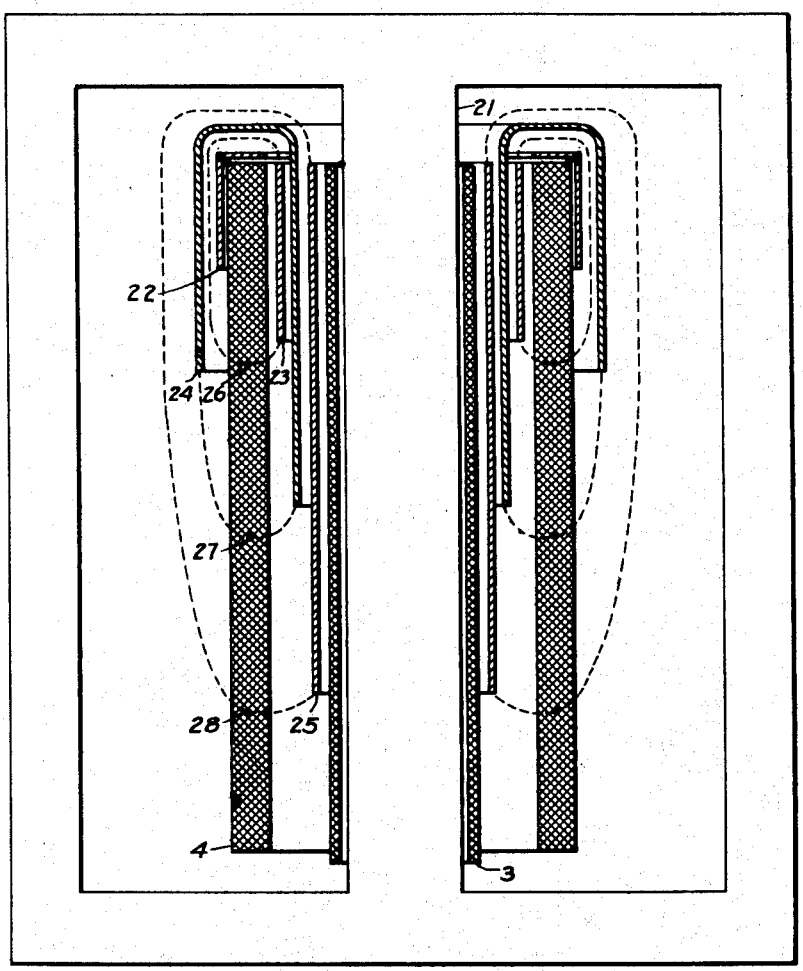
Fig. 7 is a sectional view of the windings of a core type transformer showing another embodiment of the invention and the location of the equi-potential surfaces, of the various electrostatic plates, shown dotted.

The electrostatic plates 23, 24 and 25 are so designed that the capacities in series between the line terminal 22 and ground, are equal. The plates are, therefore, equally spaced between the high voltage winding 4 and the low voltage winding 3 to provide an even distribution in voltage across the high-to-low space between these windings. The lower edges of the plates terminate so that the equi-potential surfaces cutting the coil 4 at the points 26, 27 and 28, in Fig. 7, provide an even distribution of the voltage throughout the winding 4. Should the plates 23, 24 and 25 be so designed that the capacities in series between the line static plate 22 and the low tension winding 3 be of unequal values, the positioning of the plates in the high-to-low insulating space, and the termination of the lower edges of these plates, would be adjusted correspondingly to effect even distribution of voltage, both in the high-to-low space and along the winding 4.

For the sake of clearness in illustrating the principle of the invention, the insulating material is not shown in Figs. 1, 2 and 7. The metallic surfaces are built up as an integral part of the insulating structure. Their position with respect to the high voltage winding, the low voltage winding, the core and the tank results in the uniformity of voltage distribution throughout the entire insulating structure, thus utilizing the insulating structure to its best advantage and making possible an insulating structure employing less insulating material than would otherwise be required.

Figure 8:
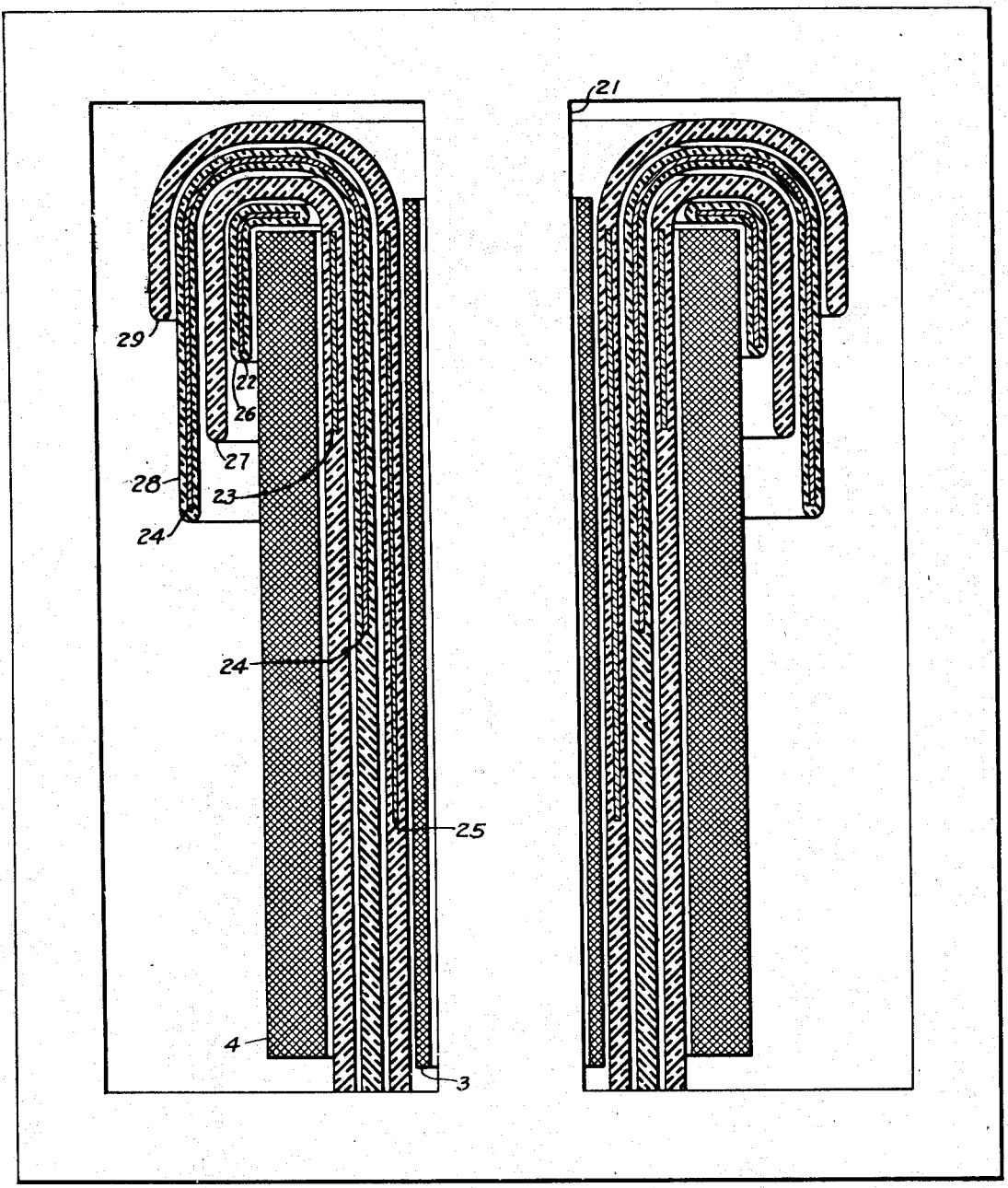
Fig. 8 is a sectional view of the embodiment of the invention illustrated in Fig. 5, showing an arrangement of the insulating barriers for supporting the electrostatic plates.

The electrostatic plates forming the metallic surfaces in the high-to-low space may be built up either into micarta tubes 26, 27, 28 and 29, as illustrated in Fig. 8, or positioned on the outside wall of micarta tubes or they may be attached on the surfaces of insulating structures built up of micarta tubes, angle rings, collars, washers, etc., interleaved and constructed in accordance with present established practice of assembling insulating structures.

Many modifications may be made in the apparatus illustrated and described without departing from the spirit of my invention, and I do not wish to be limited other than by the scope of the appended claims.

I claim as my invention:

1. Electrical induction apparatus having a winding connected between a grounded terminal and a high-voltage terminal, means for providing a substantially uniform dielectric field throughout the length of said winding comprising a line static plate surrounding and connected to the high voltage end of the winding, and a plurality of electrostatic plates capacitively coupled in series between said line static plate and ground.

2. Electrical induction apparatus having a winding connected between a grounded terminal and a high-voltage terminal, means for providing a substantially uniform dielectric field throughout the length of said winding comprising a line static plate connected to the high-voltage end of the winding, said static plate surrounding and extending across the high-voltage end of the winding, and a plurality of electrostatic plates capacitively coupled in series between said line static plate and ground.

3. Electrical induction apparatus having a winding connected between a grounded terminal and a high-voltage terminal, means for providing a substantially uniform dielectric field throughout the length of said winding comprising a line static plate connected to the high-voltage end of the winding, said static plate surrounding and extending across the high-voltage end of the winding, and an electrostatic plate surrounding said line static plate and extending across the high-voltage end of the winding and along the interior of the winding, and capacitively coupled between said line static plate and ground.

4. Electrical induction apparatus having a winding connected between a grounded terminal and a high-voltage terminal, means for providing a substantially uniform dielectric field throughout the length of said winding comprising a line static plate connected to the high-voltage end of the winding, said static plate surrounding and extending across the high-voltage end of the winding, and a plurality of electrostatic plates surrounding said line static plate and extending across the high-voltage end of the winding and along the interior of the winding and capacitively coupled in series between said line static plate and ground.

5. Electrical induction apparatus having a winding connected between a grounded terminal and a high-voltage terminal, means for providing a substantially uniform dielectric field throughout the length of said winding comprising a line static plate connected to the high-voltage end of the winding, said static plate surrounding and extending across the high-voltage end of the winding, and a plurality of electrostatic plates capacitively coupled in series between said line static plate and ground at least one of which surrounds the line static plate and extends across the high-voltage end of the winding and along the interior thereof.

6. The combination, in an electrical induction apparatus having a winding connected between a grounded terminal and a high-voltage terminal, of means for protecting said winding from the effect of surge voltages comprising a line static plate surrounding and extending across the high-voltage end of the winding, and a plurality of electrostatic plates capacitively coupled in series between said line static plate and ground and so dimensioned as to provide a substantially uniform dielectric field throughout the length of the winding upon the occurrence of a surge voltage.

7. The combination, in an electrical induction apparatus having a winding connected between a grounded terminal and a high-voltage terminal, of means for protecting said winding from the effect of surge voltages comprising a line static plate surrounding and extending across the high-voltage end of the winding, and a plurality of electrostatic plates surrounding said line static plate and extending across the high-voltage end of the winding and along the interior of the winding and capacitively coupled between said line static plate and ground and so dimensioned that the voltage distribution of the capacity network corresponds to the voltage distribution of the inductance network of the winding.

8. The combination, in an electrical induction apparatus having a winding connected between a grounded terminal and a high-voltage terminal, of means for protecting said winding from the effect of surge voltages comprising a line static plate surrounding and extending across the high-voltage end of the winding, and a plurality of electrostatic plates capacitively coupled in series between said line plate and ground and so dimensioned as to provide a substantially uniform dielectric field throughout the length of the winding upon the occurrence of a surge voltage, at least one of said plates surrounding said line static plate and extending across the high-voltage end of the winding and along the interior of the winding.

PETER L. BELLASCHI.